United States Patent [19]

Lipert

[11] Patent Number: 5,862,610
[45] Date of Patent: Jan. 26, 1999

[54] METHOD FOR COATING DRY PELLETS MADE OF WASTE BIO-SOLIDS WITH WASTE BIO-SOLIDS

[75] Inventor: Peter Lipert, Dollard des Ormeaux, Canada

[73] Assignee: Atara Corporation, Quebec, Canada

[21] Appl. No.: 580,338

[22] Filed: Dec. 28, 1995

[51] Int. Cl.⁶ .............................. F26B 7/00; B09B 3/00; C12M 1/00
[52] U.S. Cl. .................................. 34/377; 34/60; 34/376; 435/262.5; 435/283.1
[58] Field of Search ................................ 435/362.5, 267, 435/272, 283.1; 210/770; 34/60, 379, 376, 377

[56] References Cited

U.S. PATENT DOCUMENTS

| | | | |
|---|---|---|---|
| 5,092,453 | 3/1992 | Bruke | 198/673 |
| 5,337,496 | 8/1994 | Glorioso | 34/378 |
| 5,557,873 | 9/1996 | Lynam et al. | 34/379 |

*Primary Examiner*—David M. Naff
*Attorney, Agent, or Firm*—Darby & Darby

[57] ABSTRACT

Method and apparatus are provided for reprocessing dry pellets made of waste bio-solids in which the pellets and wet sludge waste bio-solids are supplied to the inlet of a material combining conveyor whose angular position can be adjusted. The pellets are coated with the sludge as they travel along the material combining conveyor to its output which feeds a dryer or oven. By adjusting the speed, length and angular position of the material combining conveyor, the amount of sludge coated onto the pellets can be controlled. The material combining conveyor is preferably a sealed shaftless screw conveyor that extends in a generally veritcal direction so that pellets not properly coated fall by gravity to the conveyor inlet. Dry pellets and wet sludge can be supplied from separate bins to a common feed conveyor such as a shaftless screw conveyor which conveys the mixture to the input of the material combining conveyor.

7 Claims, 3 Drawing Sheets

大,862,610

METHOD FOR COATING DRY PELLETS MADE OF WASTE BIO-SOLIDS WITH WASTE BIO-SOLIDS

FIELD OF THE INVENTION

The invention relates to the method and apparatus for mixing dry pellets of bio-solid material with wet sludge in order to achieve a desired degree of size and density for finished pellets.

BACKGROUND OF THE INVENTION

The handling and disposal of bio-solids, such as human waste, presents a major problem. One technique utilized is to form the bio-solids into a wet sludge having approximately an 18% to 35% concentration of the bio-solids and to process the sludge into dry pellets. The pellets contain nitrogen in slow release form. They can be sold to fertilizer manufacturers for mixing with standard fertilizers or for use directly as a general fertilizer applied to agricultural areas.

In a standard plant for producing the pellets, the finished pellets must have a certain specific density (solid content as compared to liquid) and size. If the final product in the pelletizing plant does not meet the density and size specifications, then the pellets must be reprocessed. This is usually accomplished by returning the reject pellets to mix with incoming wet sludge to be recoated with additional sludge and recooked in a dryer to correct the proportion of density and size.

Many times, the reject pellets to be reprocessed amount to 60%–65% of the output of the pellet forming operation. The pellets to be reprocessed, which are dry, are transported vertically to a raised storage bin. This is usually accomplished by a bucket elevator. Such transport produces a substantial amount of dust and spill of the pellets to be reprocessed. From the bin, the pellets are distributed by gravity feed to a mixer, typically of the paddle or pin type. The wet sludge is also transported to the mixer. The mixer must insure that the dry pellets being reprocessed are evenly coated by the wet sludge and have achieved a size of to 3 to 4 mm. From the mixer the reprocessed material, now containing the added wet sludge, is transported to a high heat dryer.

This process of the prior art has a drawback in that the dust and spills produced possibly can give rise to a flashback explosion. Also, the process is lacking in providing different ways of adjusting the moisture and recoated sludge content of the reprocessed pellets.

BRIEF DESCRIPTION OF THE INVENTION

The present invention relates to a method and apparatus for reprocessing dry pellets. In accordance with the invention, the dry pellets being reprocessed and wet sludge are provided in respective supply containers and are fed therefrom and are brought together (combined) on a feed conveyor. In a preferred embodiment of the invention, the conveyors from the respective dry pellet and wet sludge supplies are of the shaftless screw type as in the feed conveyor.

The mixture from the feed conveyor is then fed from a pressurized connection to a material combining conveyor to deliver the mixture to a dryer. Further mixing of the dry pellets and sludge and recoating of the original dry pellets occurs in the material combining conveyor as the product travels its length from inlet to outlet for delivery to the dryer. The angle of the material combining conveyor is also preferably adjustable from the horizontal through any angle up to a vertical position. It is preferred that a shaftless screw conveyor be used for the material combining conveyor since its open center allows some of the higher density pellet material, as compared to the sludge, to fall back through the open center and remix with the incoming wet sludge.

Normally, delivery of the mixture would be with the material combining conveyor near vertical or completely vertical because the mixture is generally fed into the dryer by gravity, i.e., the mixture is dropped into a dryer.

As an alternative to the material combining conveyor, there can be a simple low speed pin mixer which accepts delivery of the mixture of sludge and dry pellets from their respective conveyors that supply these items to the feed conveyor. This is to be contrasted with presently available mixers which are either of the paddle or pin type which operate at a very high speed and thereby have high maintenance costs.

OBJECTS OF THE INVENTION

An object of the invention is to provide a novel method and apparatus for mixing wet sludge with dry pellets of bio-solids which are to be reprocessed.

An additional object is to provide a method and apparatus in which dry pellets to be reprocessed and wet sludge are each fed by a respective shaftless screw conveyor onto a feed conveyor to a mixer for recoating of the dry pellets and delivery to an oven.

A further object is to provide a method and apparatus in which dry pellets of bio-solids to be reprocessed are mixed with wet sludge of bio-solids in a shaftless screw material combining conveyor for delivery to an oven.

Yet another object is to provide a method and apparatus in which dry pellets are mixed with sludge in a shaftless screw conveyor extending in a generally vertical direction for delivery to an oven and the angle of the conveyor is adjustable relative to the vertical.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
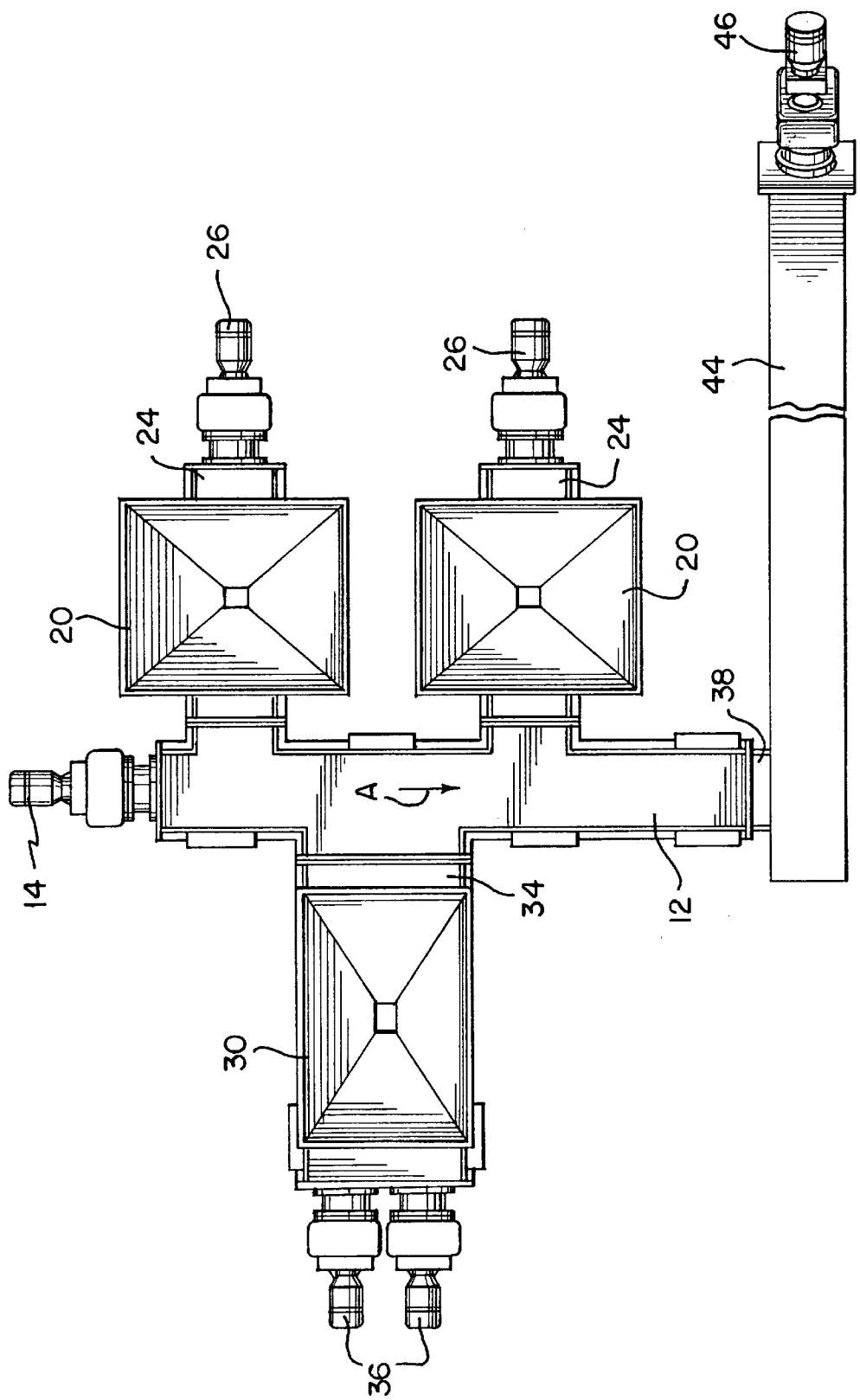
FIG. 1 is a top schematic view of the system.
Figure 2:
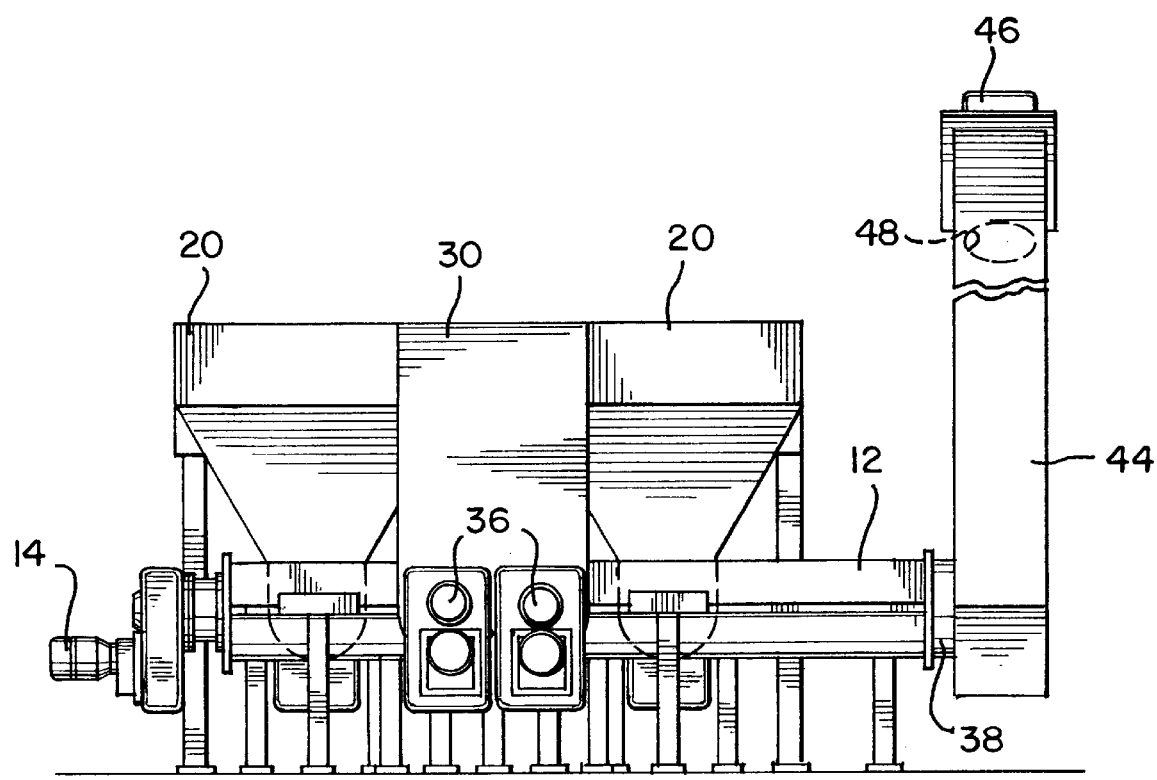
FIG. 2 is a front elevational view.
Figure 3:
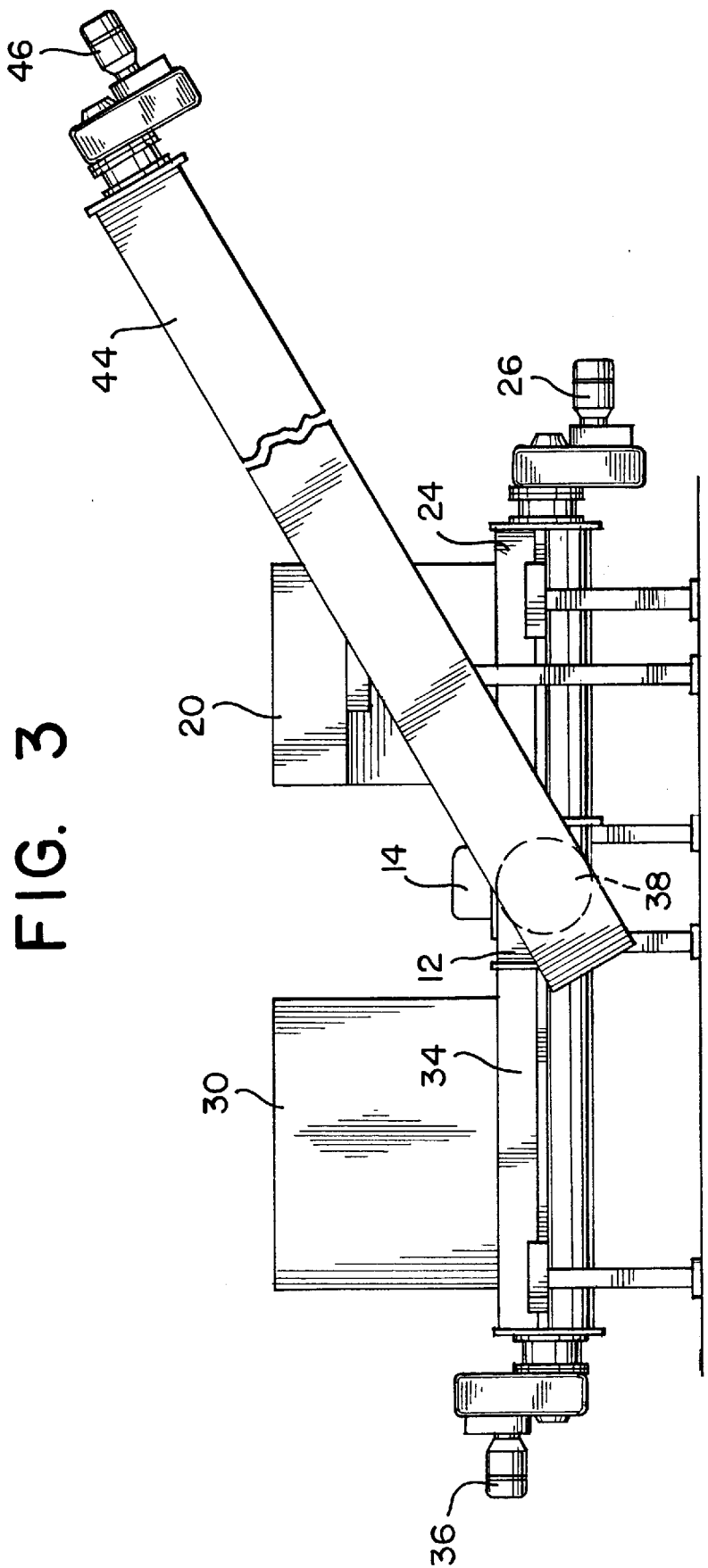
FIG. 3 is a side elevational view.

Referring to FIGS. 1–3, there is a horizontal feed conveyor 12 of any suitable length driven by a motor 14 and including other necessary conveyor elements. The feed conveyor 12 is preferably of the shaftless screw type. Along its length in the direction of feed conveyor travel, as shown by arrow A in FIG. 1, are one or more bins 20 into which dry pellets to be reprocessed are placed. This can be done by feeding the dry pellets into the top of a bin 20 from another conveyor or elevator lift (not shown) or being dumped in by any other means. The pellets being reprocessed typically have a size in the range other than the ideal, for example, 3 to 4 mm, and a dryness of 94% to 98% dry solids. The pellets are to be reprocessed, in a typical application, to a size in the range of 3 to 4 mm and with a dryness of about 95%.

Also positioned along the length of feed conveyor 12 is a bin 30 for wet sludge that is to be used to coat or otherwise mix with the dry pellets from bins 20 being reprocessed. The wet sludge is supplied to its bin 30 from any suitable source and can be dumped or pumped into the bin. While bins 20 and 30 are shown as being on opposite sides of the feed conveyor 12, they can be on the same side.

At the bottom of each dry pellet bin 20 is a conveyor 24, preferably of the shaftless screw type, driven by a motor and other necessary conveyor elements 26. Similarly, at the bottom of the sludge bin 30 is a conveyor 34, also preferably of the shaftless screw feed type, driven by a motor and other necessary conveyor elements 36. Each of the bin conveyors 24 and 34 has an outlet to the feed conveyor 12. Thus, dry pellets being reprocessed empty from a bin 20 into its conveyor 24 and are carried to the main feed conveyor 12. Similarly, wet sludge from bin 30 empties into its conveyor 34 from which it is carried to the feed conveyor 12.

Each of the bins 20 and 30 has the necessary conventional elements to control the material discharge rate from the feeding bin onto its respective conveyor 24 and 34. Similarly, each of the conveyors 24, 34 has the necessary control elements, such as motor speed control, screw size, etc., to control material feeding rate from the conveyor 24, 34 to the feed conveyor 12, thereby to control the mix proportions.

The dry pellets from a bin 20 and the wet sludge from bin 30 are mixed somewhat as they are conveyed by the feed conveyor 12 along its length. The mixture is delivered to a pressurized axial connection 38 which is the inlet of an elongated material combining conveyor 44. The connection 38 also permits rotational adjustment of the angle of the material combining conveyor 44 relative to the vertical direction. Its position is basically adjustable to any angle from the horizontal direction to the vertical. Conveyor 44 is also preferably of the shaftless screw type driven by a motor and other necessary elements 46. The material combining conveyor 44 has a discharge outlet 48 at its (upper) end remote from its inlet. The outlet 48 of conveyor 44 feeds the reprocessed pellets to a dryer or an oven (not shown).

As the mixture travels the length of conveyor 44 between inlet 38 and outlet 48, the originally dry pellets are recoated with sludge. That is, there is further mixing of the dry pellets with the sludge. As described, the material combining conveyor 44 is rotatable about connection 38 to be positioned relative to the horizontal from 0° to 90°. The ability to adjust the inclination angle of material combining conveyor 44 has several advantages. First, it can adjust the height of the discharge outlet 48 to the height of the dryer or oven into which the discharge outlet delivers the recoated pellet product. Second, the angle of inclination of conveyor 44 is a control parameter for the reprocessing of the dry pellets. That is, depending upon the inclination angle of conveyor 44, more or less of the wet sludge adheres to the dry pellets being recoated with wet sludge. The rotational speed of the conveyor screw also can be controlled. Further, the conveyor 44 can be made as long as needed.

The use of a shaftless screw type conveyor for the conveyor 44 has an advantage in that the conveyor open center permits some of the higher density material, i.e., dry pellets, to fall by gravity through the open center of the conveyor back to the pressurized inlet 38 to mix again with additional wet sludge supplied from feed conveyor 12.

Normally, the material combining conveyor 44 has a high angle of inclination, or is kept vertical, since delivery of the final reprocessed product from its outlet 48 to the dryer or oven is by gravity. In general, the closer the angle of conveyor 44 inclination is to the vertical, the better is the mixing.

Factors which affect the reprocessing of the rejected dry pellets are:

a. delivery rate of pellets from bin 20 to feed conveyor 12.

b. delivery rate of sludge from bin 30 to feed conveyor 12.

c. feed rate of feed conveyor 12.

d. inclination of the material combining conveyor 44.

e. feed rate of the material combining conveyor 44.

f. length of the material combining conveyor.

One or more of these parameters can be adjusted to achieve the desired density and size of the reprocessed product being fed to the dryer or oven from the outlet 48 of the material combining conveyor. Shaftless screw conveyors that can be utilized in the invention are those manufactured by Spinac of Malmo, Sweden. Such a Model U-355 (for the conveyors 12, 24 and 34) and model OK-355 (for the material combining conveyor 44). Suitable shaftless screw type conveyors of other manufacturers can be used.

The system of FIGS. 1–3 has several advantages. The presence of dust from the dry pellets at the entry to a dryer or oven is minimized. Also, as listed above, a number of separately adjustable control parameters are provided to control the characteristics of the reprocess pellets supplied from the discharge 48 of the material combining conveyor 44.

A variation of the invention includes supplying the dry reject pellets from at or near ground level and lifting them vertically directly to the feed conveyor 12 by a shaftless screw conveyor. The dry reject pellets are fed by a horizontal conveyor to the inlet of a vertical conveyor, preferably of the shaftless type, such as 44. The sludge can be supplied directly to the input of the vertical conveyor.

What is claimed is:

1. A method for treating dry pellets made from waste bio-solids with wet sludge of waste bio-solids to change the size and/or liquid to solid density of the pellets for delivery to a dryer comprising:

supplying dry pellets and wet sludge to an inlet of a generally horizontal screw feed conveyor and mixing the dry pellets and wet sludge to form a mixture while being conveyed to an outlet of the feed conveyor; and supplying the mixture from the feed conveyor outlet to an inlet of a lower end of a sealed shaftless screw material combining conveyor having an open center which extends generally vertically, conveying the mixture from the inlet of the material combining conveyor upwardly along the length of the conveyor to an outlet at its upper end from which to be discharged to a dryer, the pellets being coated with sludge during the upward conveying of the mixture and higher density dry pellets falling by gravity back through the conveyor open center to the material combining conveyor inlet to further mix with the mixture from the feed conveyor.

2. A method as in claim 1 wherein the sealed shaftless conveyor can be adjustably inclined at an angle to the horizontal and further comprising the step of selecting at least one of speed, length and angle of inclination of said conveyor to control the degree of coating of the dry pellets being treated with the sludge.

3. A method as in claim 2 wherein supply of the dry pellets comprises a first bin for holding the pellets to be treated and further comprising the step of transporting the dry pellets from an outlet of said first bin to an inlet of said feed conveyor.

4. A method as in claim 3 wherein supply of the wet sludge comprises a second bin for holding the sludge and further comprising the step of transporting the sludge from an outlet of said second bin to the inlet of said feed conveyor.

5. A method as in claim 3 wherein transporting the dry pellets from an outlet of said first bin to said feed conveyor includes conveying by a shaftless screw conveyor.

6. A method as in claim 4 wherein transporting the wet sludge from an outlet of said second bin to said feed conveyor includes conveying by a shaftless screw conveyor.

7. A method as in claim 1 wherein said conveying by said feed conveyor takes place in an open environment.

* * * * *